United States Patent
Marshall et al.

(10) Patent No.: US 7,640,355 B1
(45) Date of Patent: Dec. 29, 2009

(54) SUPPLEMENTAL QUEUE SAMPLING TECHNIQUE FOR PACKET SCHEDULING

(75) Inventors: John W. Marshall, Cary, NC (US);
Steve F. Kappes, Cary, NC (US);
Robert T. Olsen, Dublin, CA (US)

(73) Assignee: Cisco Technology, Inc., San Jose, CA (US)

( * ) Notice: Subject to any disclaimer, the term of this patent is extended or adjusted under 35 U.S.C. 154(b) by 1276 days.

(21) Appl. No.: 10/636,099

(22) Filed: Aug. 7, 2003

(51) Int. Cl.
*G06F 15/16* (2006.01)
*H04L 12/28* (2006.01)

(52) U.S. Cl. .............. 709/232; 370/395.42; 370/395.4; 370/695.43

(58) Field of Classification Search ............. 370/395.4, 370/395.42, 235, 231, 468, 412, 230.1, 395.32, 370/232, 395.43; 710/317; 709/232
See application file for complete search history.

(56) References Cited

U.S. PATENT DOCUMENTS

| | | | |
|---|---|---|---|
| 6,058,114 A | 5/2000 | Sethuram et al. | |
| 6,075,771 A * | 6/2000 | Wolff et al. | 370/232 |
| 6,175,570 B1 | 1/2001 | Cukier et al. | |
| 6,320,845 B1 | 11/2001 | Davie | |
| 6,377,583 B1 * | 4/2002 | Lyles et al. | 370/412 |
| 6,526,060 B1 | 2/2003 | Hughes et al. | |
| 6,546,017 B1 | 4/2003 | Khaunte | |
| 6,661,802 B1 * | 12/2003 | Homberg et al. | 370/412 |
| 6,687,781 B2 * | 2/2004 | Wynne et al. | 710/317 |
| 6,850,540 B1 * | 2/2005 | Peisa et al. | 370/468 |
| 6,904,014 B1 * | 6/2005 | Gai et al. | 370/230.1 |
| 7,042,843 B2 * | 5/2006 | Ni | 370/231 |
| 7,110,359 B1 * | 9/2006 | Acharya | 370/235 |
| 7,272,144 B2 * | 9/2007 | Cloonan et al. | 370/395.42 |
| 7,292,578 B1 * | 11/2007 | Kerr et al. | 370/395.32 |
| 7,296,288 B1 * | 11/2007 | Hill et al. | 726/2 |
| 2004/0071154 A1 * | 4/2004 | Wentink | 370/448 |
| 2004/0258072 A1 * | 12/2004 | Deforche | 370/395.4 |

OTHER PUBLICATIONS

Brown, R., Calendar Queues: A Fast 0(1) Priority Queue Implementation for the Simulation Event Set Problem, Communications of the ACM, Oct. 1988, vol. 31, No. 10, pp. 1220-1227.

* cited by examiner

*Primary Examiner*—Jungwon Chang
(74) *Attorney, Agent, or Firm*—Cesari and McKenna, LLP

(57) ABSTRACT

A technique for improving utilization of a data link coupled to a network. Scores are generated for one or more data flows that transfer onto the network via the data link. The scores are kept in a "scorecard" that represents a pool of data flows that are eligible to transfer data onto the data link when the data link becomes idle. Each score represents a rating of a particular data flow's eligibility to transfer data onto the data link when it becomes idle. A check is performed to determine if the data link is idle, and, if so, data associated with the highest scoring data flow are transferred onto the data link.

20 Claims, 6 Drawing Sheets

SUPPLEMENTAL QUEUE SAMPLING TECHNIQUE FOR PACKET SCHEDULING

BACKGROUND OF THE INVENTION

1. Field of the Invention

The present invention relates to data networking and in particular to optimizing data link utilization in an intermediate network node.

2. Background Information

A computer network is a geographically distributed collection of interconnected communication links and segments for transporting data between nodes, such as personal computers and workstations. The nodes typically transport the data over the network by exchanging discrete frames or packets containing the data in accordance with various pre-defined protocols, such as the Transmission Control Protocol/Internet Protocol (TCP/IP) or the Internetwork Packet eXchange (IPX) protocol.

Many types of networks are available, with the types ranging from local area networks (LANs) to wide area networks (WANs). LANs typically connect nodes over dedicated private communications links located in the same general physical location, such as a building or a campus. WANs, on the other hand, typically connect large numbers of geographically dispersed nodes over long-distance communications links, such as common carrier telephone lines. The Internet is an example of a WAN that connects disparate networks throughout the world, providing global communication between nodes contained in various networks.

WANs typically comprise a complex network containing many different intermediate network nodes, such as routers or switches, interconnected to form the WAN. Data (traffic) carried by the intermediate nodes often originate from various different sources, such as source nodes coupled to the WAN, and are destined for various destinations, such as destination nodes also coupled to the WAN. At each intermediate node, traffic may arrive at various times and rates and, consequently, cause the intermediate node to become congested. Congestion, in turn, may lead to delays in delivering the traffic through the intermediate node. Such delays may not be tolerable for time-sensitive data, such as digitized voice data; thus, for certain types of traffic, it may be desirable to provide a guaranteed level of service to ensure timely delivery of the traffic.

One way to provide a guaranteed level of service between source and destination end nodes connected via a WAN is to establish a data flow, such as a virtual connection (VC), between the nodes, wherein the data flow is associated with a "committed rate" component, such as a committed information rate (CIR). A CIR defines the level of service provided by the data flow and is a guarantee (contract) of a certain end-to-end bandwidth between the nodes.

Intermediate nodes carrying the data flow typically reserve (commit) resources that are sufficient to ensure the bandwidth set forth by the CIR is available to the data flow. For example, assume two end nodes are connected to a WAN comprising a plurality of intermediate nodes and the nodes utilize a VC associated with a CIR of 64-kilobits-per-second (Kbps). Each intermediate node carrying the data flow would commit sufficient resources to the VC to meet the VC's CIR bandwidth requirement, i.e., 64-Kbps.

In a typical WAN arrangement, the intermediate nodes are interconnected via high-speed (data) links that are generally capable of carrying data at rates much higher than the rates generated by the individual end-nodes. This enables the intermediate nodes to carry several data flows on a link. For example, a data link coupling two intermediate nodes may be capable of carrying data at a rate of 1.544 Megabits-per-second (Mbps), whereas, end-nodes coupled to the intermediate nodes may only generate data at a peak rate of 64-Kbps. Thus, the data link has sufficient capacity to carry up to 24 VCs, each of which is associated with a CIR of 64-Kbps.

In addition to being associated with a CIR component a data flow may also be associated with an "excess rate" component, such as an excess information rate (EIR). An EIR specifies a data rate (in, e.g., bits-per-second) in excess of the CIR that a data flow can "burst" onto the data flow at a particular intermediate node when the intermediate node is not congested. Unlike the CIR, the EIR is not a guaranteed rate; thus, the intermediate nodes carrying the data flow do not commit resources to guarantee the EIR. Rather, the intermediate nodes utilize excess capacity, when available, to provide for the EIR.

A packet buffer is often employed in an intermediate node to temporarily hold packets processed by the node. The packet buffer often comprises one or more memory devices that are arranged to form one or more First-In First-Out (FIFO) output queues, wherein each queue may be associated with a particular data flow, e.g., a VC. Moreover, the intermediate node may employ a scheduler to determine when packets are removed from an output queue and transferred onto the network. The scheduler, in turn, may employ one or more calendar queues that are used to determine the time when a particular packet is removed from a particular output queue.

Often when a packet is removed from an output queue, the scheduler examines the rate information associated with the output queue's data flow, such as the CIR and EIR components of the data flow. The scheduler may use this information to determine a future time, which represents the time when the next packet is removed from the output queue in order for the data flow to be compliant with the rate information. The scheduler may then place a queue identifier (QID) that identifies the output queue in an entry (time slot) in the calendar queue corresponding with the future time. As time advances and the entry reaches the head of the calendar queue, the scheduler typically removes the next packet from the output queue associated with the QID contained in the entry. The scheduler may then schedule a future time for a subsequent packet to be removed from the output queue in a manner as described above.

One problem with above arrangement is that if the data flow contains an EIR component, the future time slot determined for the data flow may be less than optimal with respect to data link utilization. For example, if a VC contains both CIR and EIR components and the data link associated with the VC is congested at the time a future time slot is determined, the scheduler may assume the data link does not have excess capacity available to accommodate the EIR component. Thus, the scheduler may only use the CIR component to determine the time slot for the VC. Consequently, the determined time slot may be later in time than it would be if the EIR component were included in the determination. If shortly after the determination is made the data link suddenly becomes idle (i.e., has excess capacity), the data flow may not be able to take advantage of the link's sudden excess capacity as the determined time slot may not be at the head of the calendar queue. As a consequence, the data link may become underutilized.

One possible solution to this problem is to remove the earliest entry in the calendar queue associated with an output queue whose data flow contains an EIR component, and transfer data from the output queue onto the data link when the data link becomes idle. However, this solution is complex and may be time consuming as it may involve, inter alia, scanning and removing entries from the calendar queue. Moreover, depending on the configuration of the scheduler this solution may be difficult to implement. For example, if the scheduler is implemented using logic gates, the number of gates involved in scanning and modifying the calendar queue may become quite impractical.

SUMMARY OF THE INVENTION

The present invention relates to a technique for improving utilization of a data link carrying data flows associated with an excess rate level of service component. According to the technique, scores are generated for one or more data flows carried by the data link. The scores are kept in a "scorecard" that represents a pool of data flows eligible to transfer data onto the data link when the data link becomes idle. Each score represents a rating of a particular data flow's eligibility to transfer data onto an associated data link when it becomes idle. When a data link becomes idle, the data flow associated with the data link that has the highest score in the score card is identified and data associated with the identified data flow are transferred onto the data link.

In the illustrated embodiment, data flows are associated with various output queues. Data acquired from a data flow by an intermediate node are processed by (i) scheduling the data for transfer onto a data link coupled to the node and (ii) placing the data on the data flow's output queue for transfer onto the data link. The data flow may be further associated with rate information, such as a committed information rate (CIR) component and optionally an excess information rate (EIR) component. A scheduler schedules a packet contained in an output queue for transfer onto a data link by (i) acquiring the rate information associated with the queue, (ii) determining a time slot (entry) in a calendar queue using the rate information, and, (iii) placing a queue identifier (QID) associated with the output queue in the determined time slot.

Auxiliary queue logic contained in the node keeps a scorecard for output queues associated with an excess rate component (e.g., an EIR component). When a time slot containing a QID reaches the head of the calendar queue, the QID is transferred to a traffic manager, which acquires the packet from the queue and transfers it onto the data link. The traffic manager notifies the auxiliary queue logic that a packet has been transferred from a particular queue. The auxiliary queue logic, in turn, examines rate information associated with the queue and determines if the rate information includes an excess rate component. If so, the auxiliary queue logic (i) determines a score based on the rate information, and (ii) updates the scorecard to track the highest scoring queues associated with an excess rate component for the data link. When the data link becomes idle (i.e., a time slot that does not contain a QID reaches the head of the calendar queue), calendar queue logic containing the calendar queue notifies the auxiliary queue logic, which responds by locating the QID of the highest scoring output queue in the scorecard. The auxiliary queue logic then transfers the QID to the traffic manager, which dequeues the packet at the head of the output queue associated with the QID and transfers the packet unto the network.

BRIEF DESCRIPTION OF THE DRAWINGS

The above and further advantages of the invention may be better understood by referring to the following description in conjunction with the accompanying drawings in which like reference numbers indicate identical or functionally similar elements.

DETAILED DESCRIPTION OF AN ILLUSTRATIVE EMBODIMENT

Figure 1:
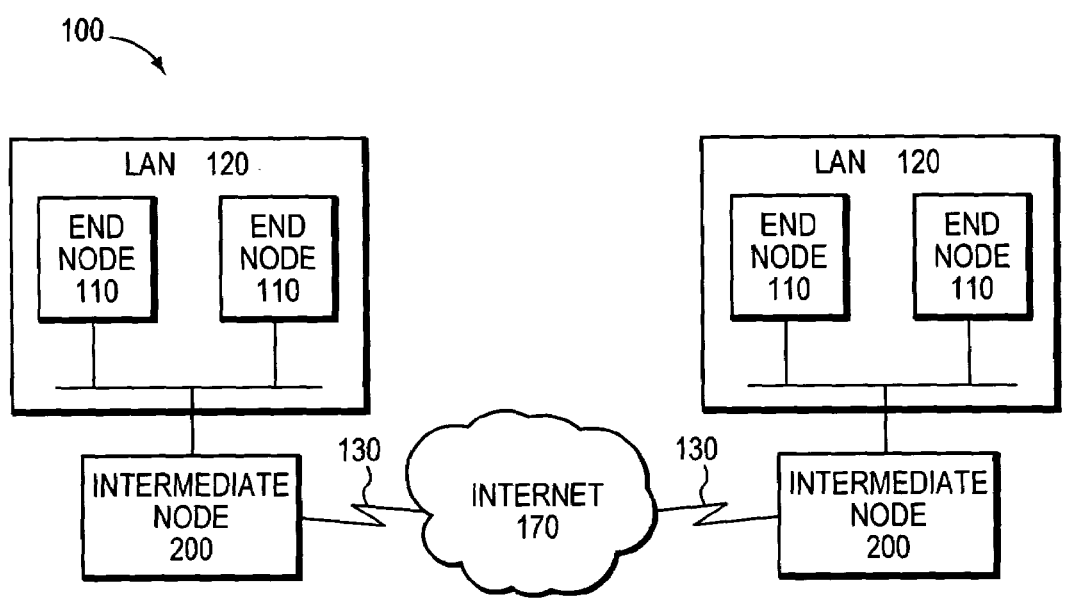
FIG. 1 is a schematic block diagram of a computer network that may be advantageously used with the present invention.

FIG. 1 is a schematic block diagram of a computer network 100 that may be advantageously used with the present invention. The computer network 100 comprises a collection of communication (data) links and segments connected to a plurality of nodes, such as end nodes 110 and intermediate nodes 200. The communication links and segments may comprise local area networks (LANs) 120, wide area networks (WANs), such as Internet 170, and WAN links 130 interconnected by intermediate nodes 200 to form an internetwork of computer nodes. These internetworked nodes communicate by exchanging data packets according to a predefined set of protocols, such as the Transmission Control Protocol/Internet Protocol (TCP/IP) and the Internetwork Packet eXchange (IPX) protocol.

Figure 2:
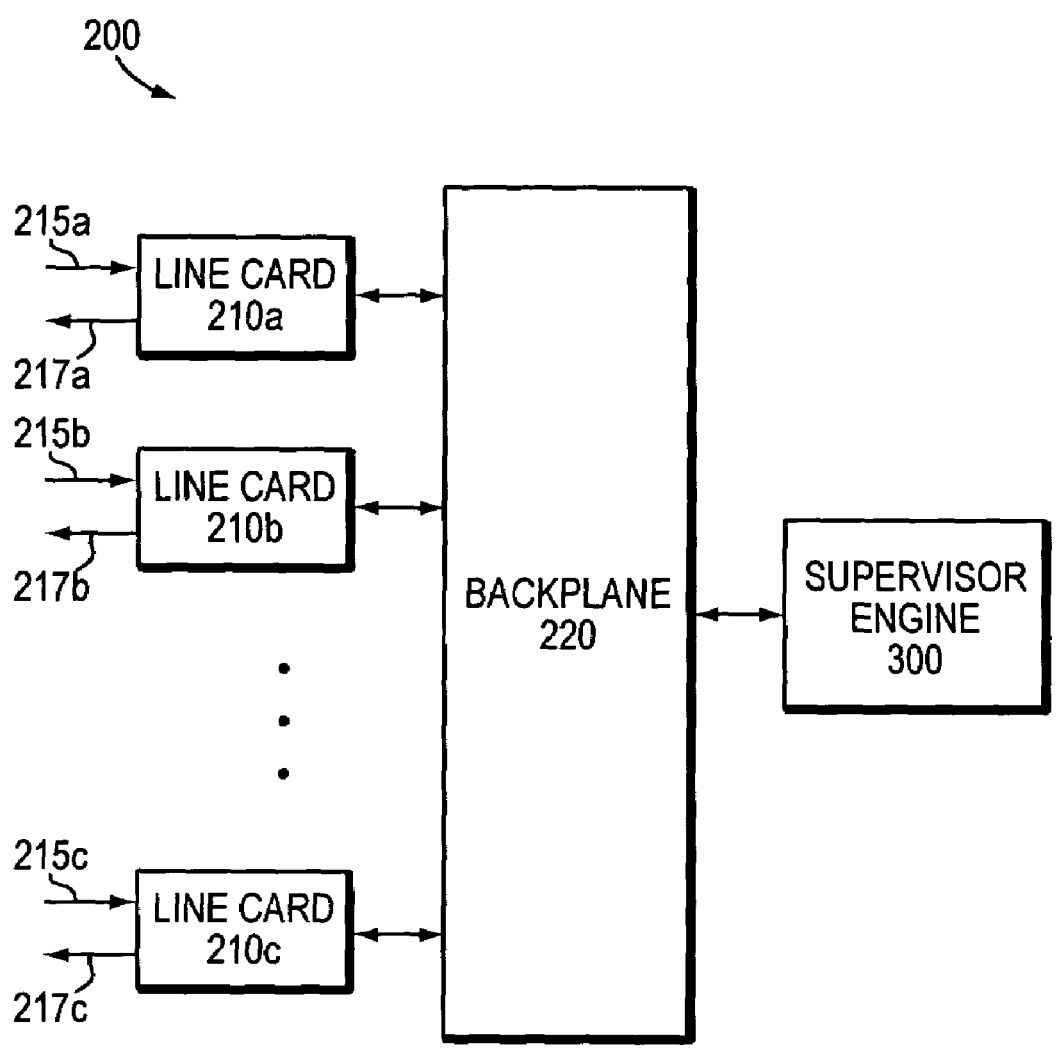
FIG. 2 is a high-level schematic block diagram of an intermediate node that may be advantageously used with the present invention.

FIG. 2 is a partial block diagram of an intermediate node 200 that illustratively is a switch that may be advantageously used with the present invention. An example of intermediate node that may be used with the present invention is the Cisco 6500 Series Switch available from Cisco Systems, Incorporated, San Jose, Calif. Intermediate node 200 supports various communication protocols including, e.g., Asynchronous Transmission Mode (ATM), Ethernet, Fast Ethernet (FE), Gigabit Ethernet (GE) and multi-channel T3 (T3), and comprises a plurality of cards including line cards 210 and a supervisor engine (SE) card 300 interconnected by a backplane 220.

The line cards 210 couple (interface) the switch 200 with the network 100. To that end, each line card 210 comprises logic that enables node 200 to receive and transmit data over the network through input ports 215 and output ports 217, respectively, using various protocols such as, e.g., ATM, FE, GE, and T3. Moreover, the input 215 and output 217 ports of a line card 210 may be coupled to a data link, such as link 130. The line cards 210 forward data, e.g., packets, received from the network 100 onto the backplane 220, as well as transmit data acquired from the backplane 220 to the network 100. The backplane 220 comprises logic and a point-to-point interconnect backplane that interfaces the line cards 210 with the SE 300 and enables data to be transferred between the line cards 210 and the SE 300.

Figure 3:
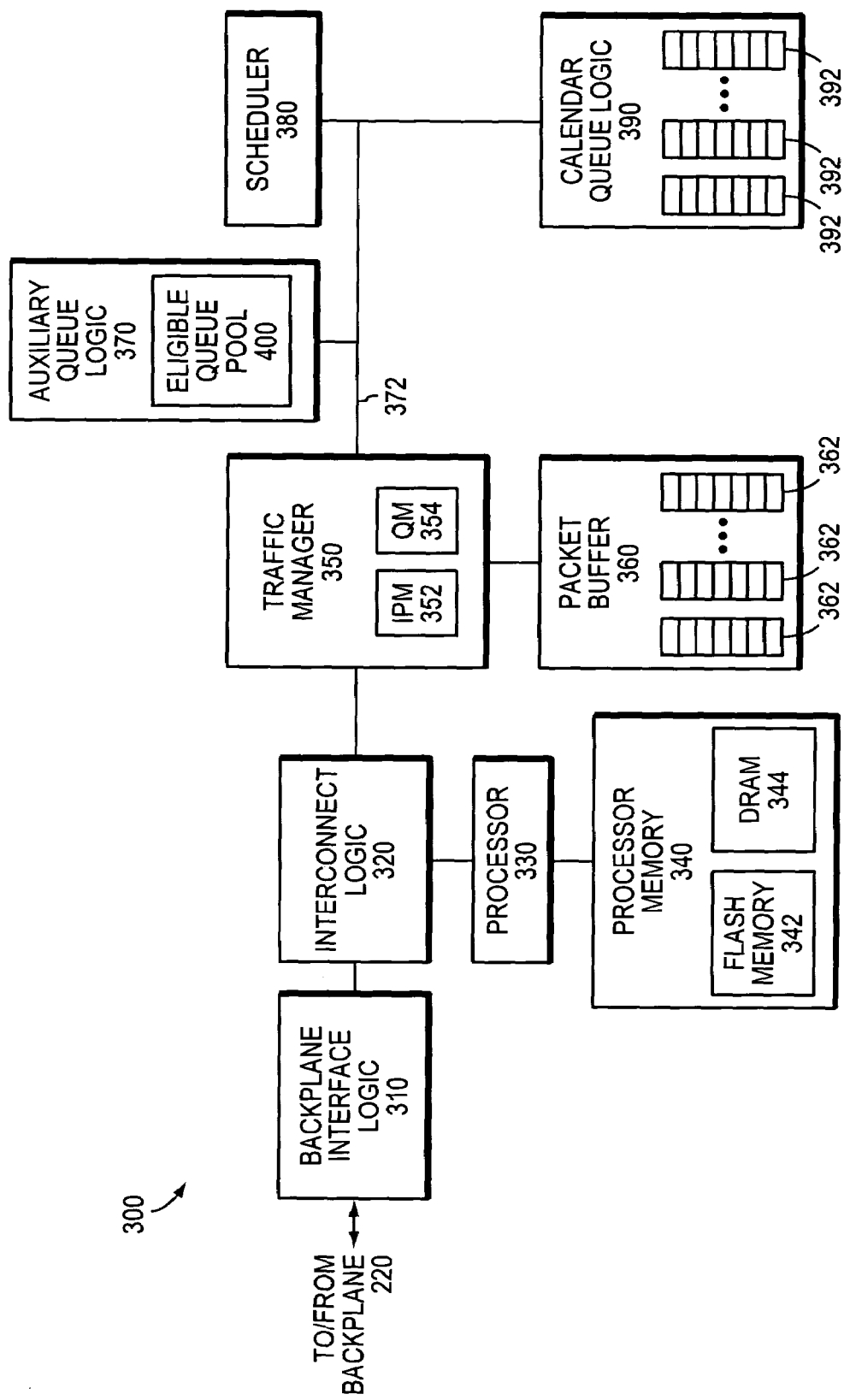
FIG. 3 is a partial schematic block diagram of a supervisor engine that may be advantageously used with the present invention.

The SE 300 comprises logic that is adapted to manage switch 200 and process various packets transferred to the switch 200 from the network via the line cards 210. FIG. 3 is a partial block diagram of a SE 300 that may be advantageously used with the present invention. SE 300 comprises backplane interface logic 310, interconnect logic 320, processor 330, processor memory 340, traffic manager 350, packet buffer 360, auxiliary queue logic 370, scheduler 380, and calendar queue logic 390. The backplane interface logic 310 contains logic that enables SE 300 to communicate over the backplane 220 with other cards (e.g., line cards 210) connected to the backplane 220 using various data and control signals.

The interconnect logic 320 is illustratively a field-programmable gate array (FPGA) configured to interface the backplane interface logic 310 and processor 330 with the traffic manager 350, as well as enable these components to exchange various data and control signals. The processor 330 comprises processing elements and logic that are capable of executing instructions and accessing data contained in the processor memory 340. An example of processor 330 that may be advantageously used with the invention is the BCM1250 processor available from Broadcom Corporation, Irving, Calif.

The processor memory 340 comprises, illustratively a 64-Megabyte (MB) non-volatile flash memory 342 and a 512 MB dynamic-random-access memory (DRAM) 344. The flash memory 342 and DRAM 344 hold data and software routines that enable (adapt) the processor 330 to perform various functions, such as managing node 200 and processing packets acquired by the node 200.

The packet buffer 360 is a conventional packet buffer organized, illustratively, into 64-byte blocks and configured to store packets processed by the SE 300. Buffer 360 contains various data structures including output queues 362 that are illustratively conventional first-in-first-out (FIFO) output queues configured to hold data (e.g., packets) transferred from the SE 300 to the network via line cards 210. Each output queue 362 is associated with a queue identifier (QID) that uniquely identifies the queue. Moreover, each output queue 362 is associated with a data flow, such as a virtual connection (VC), carried on a particular data link or sub-link, such as link 130 (FIG. 1), coupled to node 200. As used hereafter, a data link commonly refers to a data link or sub-link. Illustratively, packet buffer 360 comprises reduced-latency DRAM (RLDRAM) configured to implement a 512-Mb buffer capable of holding up to 8192 output queues 362.

The traffic manager 350 comprises various logic and memory elements that are configured to, inter alia, enqueue (place) data acquired by the SE 300 onto output queues 362, dequeue (remove) the data from the output queues 362, and transfer the dequeued data onto the network via the line cards 210. To that end, traffic manager 330 contains an internal packet memory (IPM) 352 configured to hold data in transit to and from the output queues 362 and a queue manager (QM) 354. The QM 354 manages the output queues 362 including allocating blocks of memory in the packet buffer 360 to hold data placed in the output queues 362, placing data held in the IPM 352 in the output queues 362, dequeuing data from the output queues 362, and deallocating blocks of memory in the packet buffer 360 associated with dequeued data.

The calendar queue logic 390 comprises various logic and memory elements configured to implement one or more calendar queues 392. Each calendar queue 392 is a conventional real-time calendar queue comprising a plurality of entries (time slots) wherein each entry represents a particular time. A real-time calendar queue is defined herein as a queue having N entries with width w, or covering w time. Items are placed in the calendar queue according to a time associated with the items where an item with time t greater than the current time is placed in entry (time slot) n in accordance with the following formula:

$$n = (t/w) \% N$$

wherein "%" is the modulus operator. Calendar queues are described in R. Brown, "Calendar Queues: A Fast 0(1) Priority Queue Implementation for the Simulation Event Set Problem," Communications of the ACM, October 1988, Vol. 31, No. 10, which is hereby incorporated by reference as though fully set forth herein. Illustratively, each calendar queue 392 is associated with a data link and each entry in the calendar queue 392 is configured to hold information relating to an output queue 362, such as a QID associated with an output queue 362. Alternatively, a system containing a single calendar queue wherein each entry contains information, such as an identifier that identifies a data link and a QID, may take advantage of the inventive technique described herein.

Scheduler 380 contains logic and processing elements that perform traffic management and shaping of data transferred over data flows associated with output queues 362. The scheduler 380 maintains various attribute information associated with the output queues 362, such as committed and excess rate components associated with an output queue's 362 data flow (e.g., a committed information rate (CIR) and an excess information rate (EIR)) and a calendar queue identifier (ID) that identifies a calendar queue 392 associated with the data flow. The scheduler uses this information to schedule a time when data are removed from the queue 362 and transferred onto the network. Specifically, scheduler 380 implements a scheduling algorithm that (i) examines the rate information associated with an output queue's data flow, (ii) determines the time when data are dequeued from the head of the output queue 362 based upon the rate information, and (iii) schedules the data for removal with a calendar queue 392 associated with the output queue's data flow. An example of a scheduling algorithm that may be used with the present invention is described in commonly owned and assigned U.S. patent application Ser. No. 09/884,336 titled "Flexible, High Performance Support for QoS On An Arbitrary Number of Queues," which is hereby incorporated by reference as though fully set forth herein.

Operationally, incoming data is received from the network 100 by an input port 215 on a line card 210 and sent over the backplane 220 to SE 300 where the data are received by the backplane interface logic 310 and transferred through the cluster interconnect logic 320 to the traffic manager 350 for further processing. The traffic manager 350 stores the data in its IPM 352 and notifies the processor 330 that the traffic manager 350 has acquired data from the network. The processor 330 examines e.g., a packet header contained in the data, selects an output queue 362 that is to receive the data and transfers the queue's QID to the queue manager 354. The queue manager 354 allocates, as necessary, one or more blocks of memory in the packet buffer 360 to hold the data, associates the allocated blocks with the QID and issues a series of commands to the packet buffer 360 to place the data in the allocated blocks. The queue manager 354 then notifies the scheduler 380 to schedule the data for dequeuing. Using rate information (e.g., CIR and EIR) and the calendar queue ID associated with the output queue's 362 data flow, the scheduler 380 applies the rate information to its scheduling algorithm to identify a time slot (entry) in the calendar queue 392 associated with the calendar queue ID. The identified time slot indicates the time the data is to be dequeued from the output queue 362. The scheduler then places the QID of the output queue 362 in the identified calendar queue entry.

When the calendar queue entry reaches the head of the calendar queue 392, the calendar queue logic 390 transfers the QID contained in the entry to the queue manager 354. The queue manager 354, in turn, issues a series of commands to the packet buffer 360 to dequeue the data from the output queue 362 associated with the transferred QID. The dequeued data are transferred to the interconnect logic 320 which transfers the data to the interface logic 310. The interface logic 310 transfers the data over the backplane 220 to the destination line card 210 containing the output port 217 associated with the calendar queue's 392 data link. The line card 210, in turn, transfers the data out the output port 217 coupled to the data link and onto the network.

The present invention relates to a technique for optimizing network data link utilization in an intermediate network node. According to the technique, a "scorecard" is maintained for data flows that are eligible to transfer packets onto an associated data link when the link becomes idle. The scorecard contains information about the data flows including a score, which is determined from various rate information associated with the data flows. The score represents a rating of a particular data flow's eligibility to transfer data onto the idle data link. When the data link becomes idle, data associated with the highest scoring data flow associated with the link is transferred onto the data link.

SE 300 contains auxiliary queue logic 370 that is configured to select queues eligible to transfer data onto an idle data link in accordance with the inventive technique. Specifically, auxiliary queue logic 370 comprises logic that (i) acquires rate information associated with an output queue 362, (ii) generates a score based on the acquired information, (iii) keeps a scorecard of the highest scoring output queues 362, (iv) when a data link goes idle, determines an output queue 362 that is eligible to transfer data onto the idle data link, and (v) provides the output queue's 362 QID to the queue manager 354.

After the queue manager 354 dequeues (removes) data from an output queue 362 for transfer onto the network, the traffic manager 350 notifies the auxiliary queue logic 370 that the data has been dequeued. Logic 370 responds by acquiring the QID, length of the output queue 362 (illustratively represented as the number of entries, e.g., packets remaining on the output queue 362), associated with the queue (discussed below) from the traffic manager 350, as well as the calendar queue ID and rate information associated with the output queue 362 from the scheduler 380. The rate information includes a CIR component and, optionally, an EIR component.

Using the calendar queue ID, logic 370 determines the data link hierarchy associated with the output queue 362. Auxiliary queue logic 370 then examines the acquired rate information to determine if it contains an EIR component. If so, logic 370 combines the queue's length and rate information with a random component to generate a score associated with the output queue 362. Illustratively, the score is generated using the following formula:

$$\text{Score} = (Q_{length} \times W_{length}) + (Q_{rate} \times W_{rate}) + (N_{random} \times W_{random})$$

wherein $Q_{length}$ and $Q_{rate}$ are the acquired queue length and rate information, $W_{length}$ and $W_{rate}$ are weighting factors applied to adjust the $Q_{length}$ and $Q_{rate}$, respectively, and $N_{random}$ and $W_{random}$ are a random number and weight used to adjust the random number, respectively. Illustratively, $W_{length}$ is chosen by logic 370 to emphasize the $Q_{length}$ for output queues 362 that contain many entries over queues containing fewer entries. For example, an output queue 362 whose length is one has a $W_{length}$ value that is less than an output queue 362 whose length is twenty. Thus, the $Q_{length}$ value carries more weight in the overall score for the output queue 362 whose length is twenty over the output queue 362 whose length is one. Likewise, illustratively, the $W_{rate}$ value is proportional to the $Q_{rate}$, meaning the larger the $Q_{rate}$ value the larger the $W_{rate}$ value. This enables e.g., output queues 362 associated with higher speed CIRs to acquire more bandwidth than output queue 362 associated with lower speed CIRs. The $N_{random}$ value is a random component that provides statistical fairness since it is possible a large number of output queues 362 may exist that have similar lengths and CIRs. Illustratively, auxiliary queue logic 370 generates $N_{random}$ by hashing a value acquired from a free running clock (not shown) contained in the auxiliary queue logic 370. The $W_{random}$ value determines the amount of emphasis desired from the $N_{random}$ component in determining the score. For example, a large $W_{random}$ value places more emphasis on the $N_{random}$ component than a small $N_{random}$ value.

Figure 4:
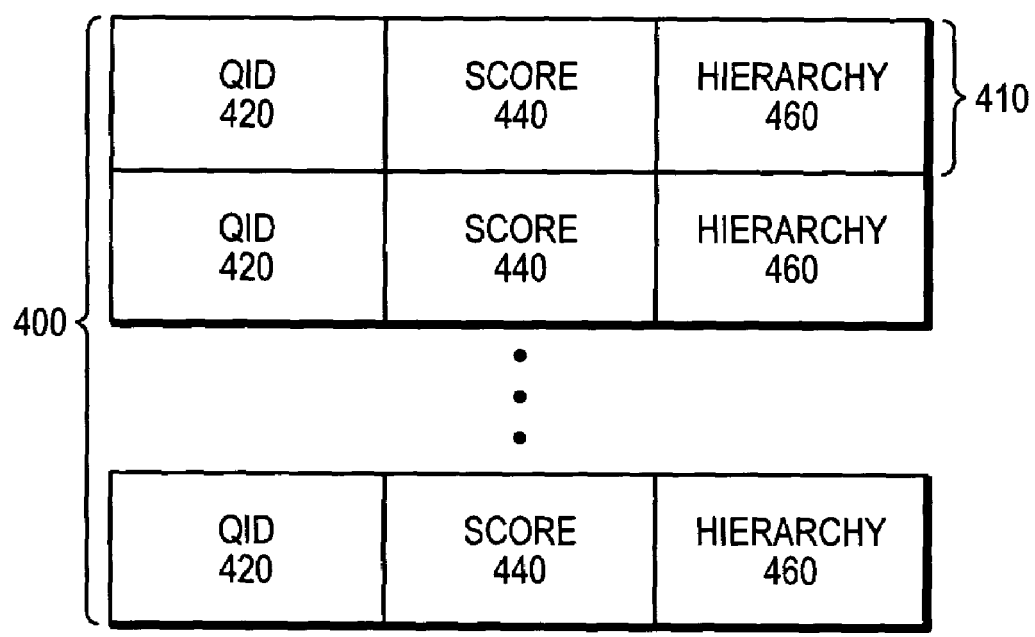
FIG. 4 is a block diagram of a "scorecard" containing a plurality of entries and representing an eligible queue pool that may be advantageously used with the present invention.

Logic 370 compares the generated score with other generated scores kept in an eligible queue pool 400 (scorecard) to determine if the generated score and information associated with the output queue 362 should be placed in the pool. FIG. 4 is a schematic block diagram of an eligible queue pool 400 that may be used with the present invention. Pool 400 is a data structure illustratively organized as a table comprising one or more entries 410 containing information related to a subset of queues 362 kept in packet buffer 360. Each entry 410 contains a QID field 420, a score field 440, and a hierarchy field 460.

The QID 420 and score 440 fields hold values that represent the QID and generated score associated with an output queue 362, respectively. The hierarchy field 460 contains a value that represents a network link/sub-link hierarchy of the data link associated with the output queue 362. For example, a value of "1.0" in the hierarchy field 460 represents a data link that is a network link labeled "1" containing no sub-links. Like-wise, a value of "2.3" in the hierarchy field 460 represents a data link that is the third sublink of a network link labeled "2." The hierarchy value 460 is illustratively an optional value included to avoid having a set of queues associated with a link and/or sub-link from occupying all of the entries in the eligible queue pool 400.

Logic 370 examines the pool 400 to determine if the data link hierarchy 460 specified in an entry 410 matches the data link hierarchy associated with the output queue 362. If so, logic 370 determines if the score of the matching entry 410 is less than the generated score. If so, logic 370 replaces the QID 420 and score 440 of the matching entry with the QID and generated score associated with the output queue 362. If no matching entries 410 are found and the pool 400 is not full, logic 370 places the QID, generated score, and hierarchy information associated with the output queue 362 in the next available entry 410 in the pool 400. Otherwise, logic 370 compares the scores 440 of the entries 410 to determine if the generated score is greater than any of the scores 440 contained in the entries. If so, logic 370 replaces the QID, score, and hierarchy contained in the lowest scoring entry 410 with the output queue's QID, generated score, and hierarchy information, respectively.

Figure 5:
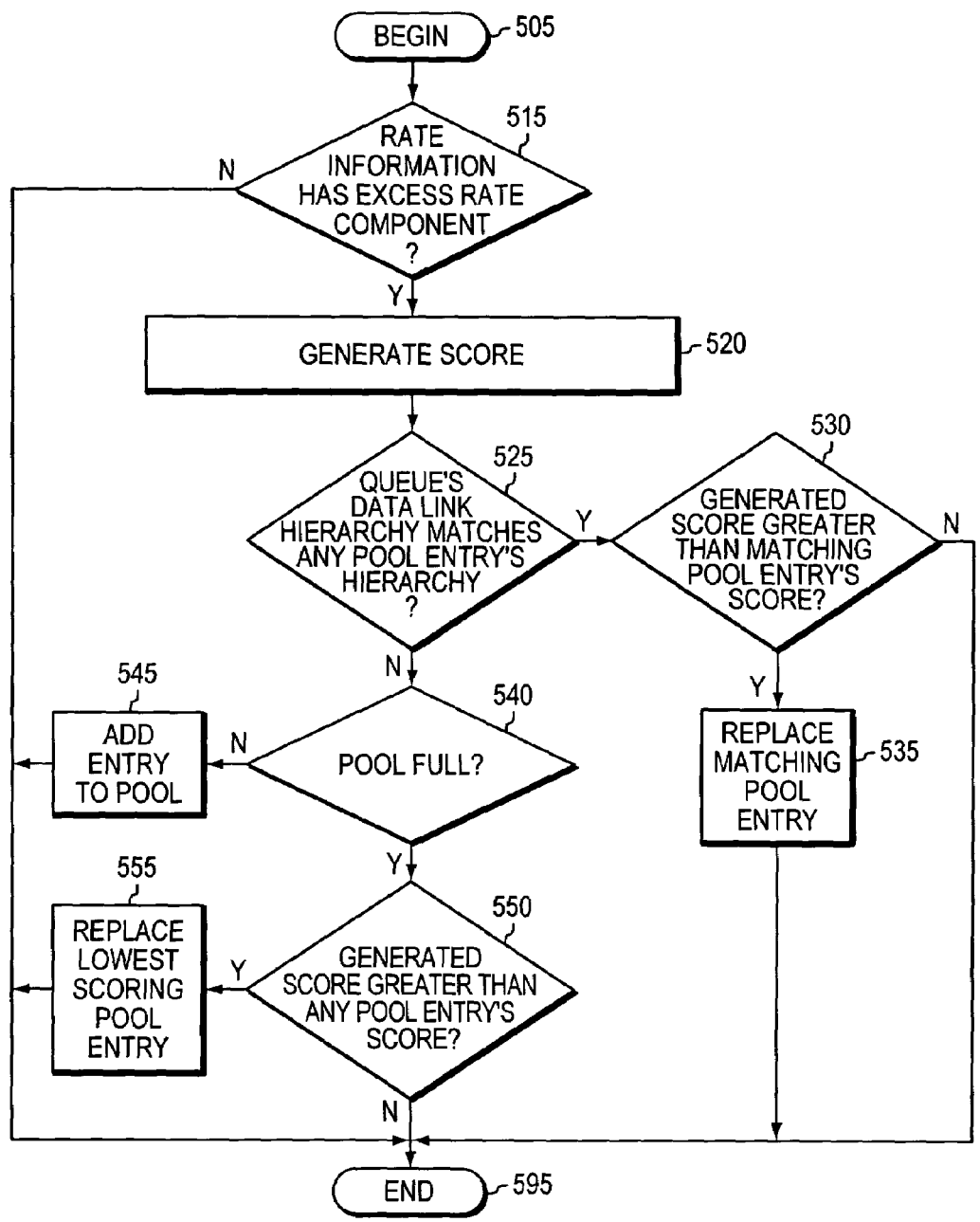
FIG. 5 is a flow chart of a sequence of steps that may be used to update the eligible queue pool in accordance with the inventive technique.

FIG. 5 is a flow chart of a sequence of steps that may be used to update the eligible queue pool 400 in accordance with the inventive technique. The sequence begins at Step 505 and proceeds to Step 515 where logic 370 examines an output queue's rate information and determines if it includes an excess rate component (e.g., an EIR). If not, the sequence proceeds to Step 595 where it ends.

Otherwise, the sequence proceeds to Step 520 where logic 370 generates a score for the output queue 362, in a manner as described above. Logic 370 then compares the hierarchy information 460 of the entries 410 in the eligible queue pool 400 with the hierarchy of the output queue's data link to determine if the hierarchy 460 of any entry 410 matches the hierarchy associated with the data link. If not, the sequence proceeds to Step 540. Otherwise, the sequence proceeds to Step 530 where logic 370 compares the score 440 of the matching entry 410 with the generated score to determine if the generated score is greater than the matching entry's score 440. If not, the sequence proceeds to Step 595 where it ends. Otherwise, the sequence proceeds to Step 535 where logic 370 replaces the contents of the matching entry 410 with the output queue's information. Specifically, logic 370 replaces the contents of the QID 420 and score 440 fields with the output queue's QID and generated score, respectively. The sequence ends at Step 595.

At Step 540, logic 370 determines if the eligible queue pool 400 is full, i.e., all the entries 410 in the pool 400 contain queue information. If the pool 400 is not full, the sequence proceeds to Step 545 where logic 370 creates an entry 410 in the pool 400 and places the QID, generated score, and hierarchy information associated with the output queue 362 in the created entry 410. The sequence ends at Step 595.

Otherwise if the pool 400 is full (Step 540), the sequence proceeds to Step 550 where the generated score is compared with the scores 440 contained in the pool's entries 410. If the generated score is greater than the score 440 of any of the entries 410 in the pool, the sequence proceeds to Step 555 where logic 370 replaces the entry 410 with the lowest score 440 by placing the QID, generated score, and hierarchy information associated with the output queue 362 in the entry's QID 420, score 440, and hierarchy 460 fields, respectively. The sequence then proceeds to Step 595 where the sequence ends.

When an empty time slot, e.g., a time slot that does not contain a QID, reaches the head of a calendar queue 392, the data link becomes idle. The calendar queue logic 390 detects the idle condition and notifies the auxiliary queue logic 370 that the data link is idle by e.g., transferring a data link identifier (ID), associated with the calendar queue's data link, to logic 370. The auxiliary queue logic 370 responds by searching the eligible queue pool 400 for the highest scoring entry 410 whose hierarchy information 460 matches the data link's ID. If a matching entry is found, the auxiliary queue logic 370 transfers the QID 420 of the matching entry to the QM 354. The QM 354, in turn, dequeues data at the head of the queue 462 associated with the QID 420 and transfers the data to the interconnect logic 320 for transfer onto the data link.

Figure 6:
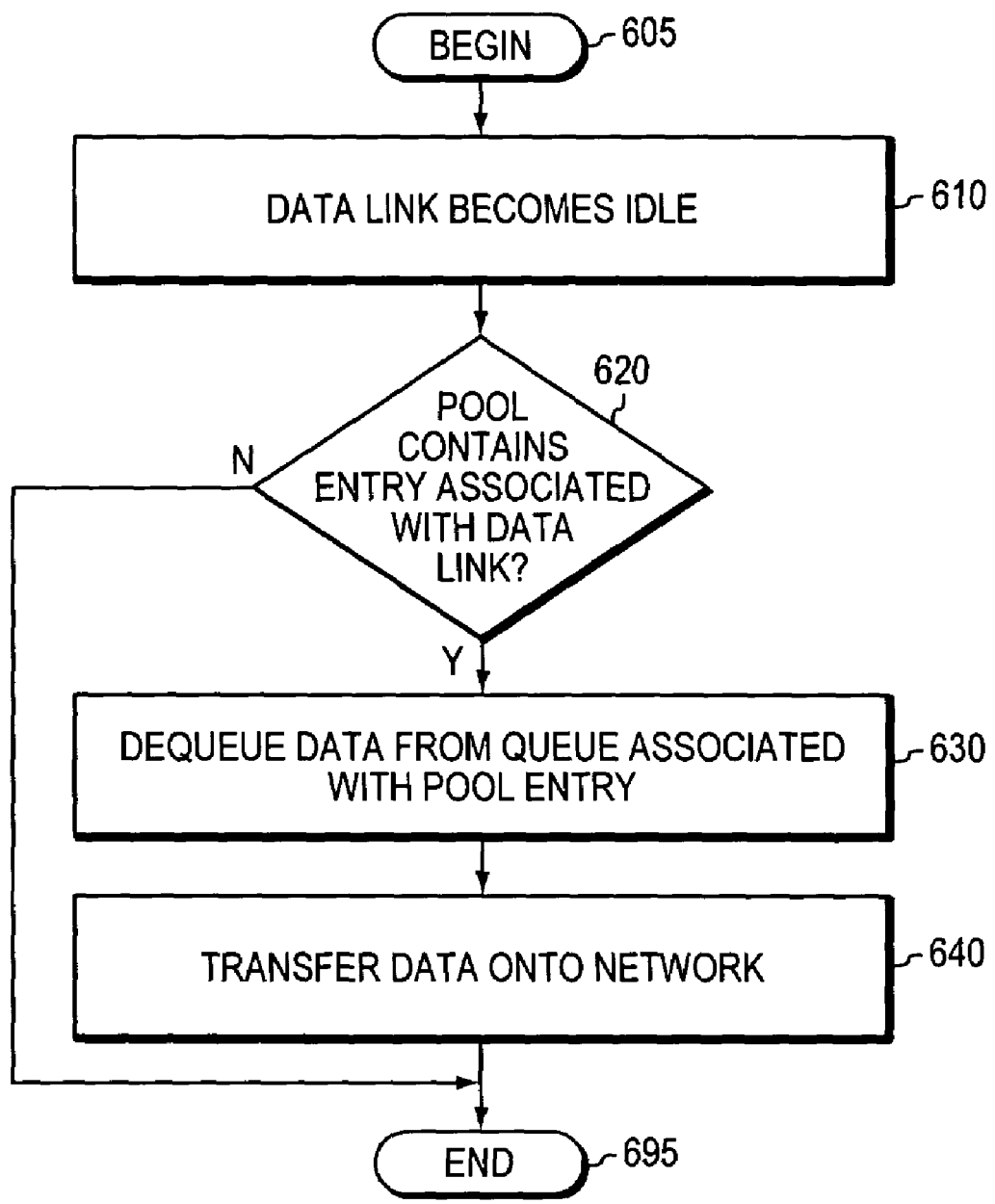
FIG. 6 is a flow chart of a sequence of steps that may be used to handle an idle data link condition in accordance with the inventive technique.

FIG. 6 is a flow diagram of a sequence of steps that may be used to handle an idle data link condition in accordance with the inventive technique. The sequence begins at Step 605 and proceeds to Step 610 where a check is performed by the calendar queue logic 390 to determine if the data link is idle, in a manner as described above. If not, the sequence ends as Step 695. Otherwise, the calendar queue logic 390 notifies the auxiliary queue logic 370 that the data link is idle by transferring an ID associated with the idle data link to logic 370, as noted above, and the sequence proceeds to Step 620 where the auxiliary queue logic 370 identifies an output queue 362 (data flow) with the highest score in the scorecard 400 that is associated with the idle link. Specifically, the auxiliary queue logic 370 examines entries 410 in the eligible queue pool 400 to determine if the pool 400 contains an entry 410 associated with the idle data link by comparing the hierarchy information 460 contained in the pool entries 410 with the transferred data link ID to determine if the hierarchy information of an entry 410 contained in the pool 410 matches the transferred data link ID. If not, the sequence proceeds to Step 695 where it ends. Otherwise, the sequence proceeds to Step 630 where the auxiliary queue logic 370 trans-fers the QID 420 of the matching entry to the QM 354, which dequeues data at the head of the output queue 362 associated with the QID, as described above. At Step 640, the traffic manager 350 transfers the dequeued data to the interconnect logic 320 for transfer onto the network, as described above. The sequence then ends at Step 695.

It should be noted that the inventive technique described herein may be implemented in whole or in part in software. For example, the functions performed by the scheduler, the calendar queue, traffic manager, and auxiliary queue logic may be implemented as software functions or subroutines containing computer executable instructions that are stored in a computer readable medium. Moreover, the eligible queue pool may be implemented as a data structure such as a linked list, an array, or a table contained in a computer readable memory, such as a DRAM.

In the above-described embodiment of the invention, scores are generated for queues associated with an excess rate component (e.g., EIR). However, this is not intended to be a limitation of the invention. Rather, the inventive technique could be used in situations where an output queue is associated with, e.g., a particular service class (as opposed to an excess rate component) that enables the queue to transfer data onto a data link whenever the link becomes idle. An example might be an output queue that is associated with an available bit-rate (ABR) service.

The foregoing description has been directed to specific embodiments of this invention. It will be apparent that other variations and modifications may be made to the described embodiments, with the attainment of some or all of their advantages. Therefore, it is an object of the appended claims to cover all such variations and modifications as come within the true spirit and scope of the invention.

What is claimed is:

1. An apparatus for improving utilization of a data link coupled to a network comprising:
    a packet buffer containing one or more queues configured to hold data, the one or more queues associated with an excess rate component;
    a queue manager coupled to the queues and configured to dequeue the data from the queues and transfer the data onto the data link;
    auxiliary queue logic coupled to the queue manager and configured to generate scores for one or more of the queues, the scores to represent ratings of eligibility to trans-fer data in accordance with the excess rate component, the auxiliary queue logic further configured to maintain a scorecard of the generated scores and notify the queue manager of a queue associated with the highest score in the scorecard to cause the queue manager to dequeue data from the queue when the link becomes idle.

2. The apparatus as defined in claim 1 comprising:
    calendar queue logic coupled to the auxiliary queue logic and configured to notify the auxiliary queue logic when the data link becomes idle.

3. The apparatus as defined in claim 1 comprising:
a scheduler coupled to the auxiliary queue logic and configured to maintain attribute information associated with the queues.

4. The apparatus as defined in claim 3 wherein the auxiliary queue logic is configured to acquire the attribute information associated with the queues from the scheduler and use the attribute information to generate scores for the queues.

5. The apparatus as defined in claim 4 wherein the attribute information includes rate information associated with the queues.

6. The apparatus as defined in claim 5 wherein the rate information includes the excess rate component.

7. The apparatus as defined in claim 3 wherein the scorecard is a data structure comprising one or more entries, and wherein each entry contains a score field configured to hold a generated score and a queue identifier (QID) field configured to hold a QID associated with a queue.

8. The apparatus as defined in claim 7 wherein the auxiliary queue logic is configured to acquire attribute information and a QID associated with a queue, generate a score associated with the queue using the attribute information, and place the score and QID in the score and QID fields, respectively, of an entry contained in the scorecard.

9. A method for improving utilization of a data link coupled to a network comprising:
holding data in one or more queues contained in a packet buffer coupled to a queue manager, the one or more queues associated with an excess rate component;
generating scores for the one or more of the queues, the scores to represent ratings of eligibility to transfer data in accordance with the excess rate component;
maintaining a scorecard of the generated scores;
determining that a data link is idle; and
dequeuing, by the queue manager, data from a queue associated with a highest score in the scorecard, and transferring the data onto the data link, in response to determining that the data link has become idle.

10. The method as defined in claim 9 further comprising:
acquiring attribute information associated with the one or more queues; and
using the attribute information to generate the scores for the one or more queues.

11. The method as defined in claim 10 wherein the attribute information includes rate information associated with the queues.

12. The method as defined in claim 11 wherein the rate information includes the excess rate component.

13. The method as defined in claim 9 wherein the scorecard is a data structure comprising one or more entries, and wherein each entry contains a score field configured to hold a generated score and a queue identifier (QID) field configured to hold a QID associated with a queue.

14. The method as defined in claim 13 further comprising:
acquiring attribute information and a QID associated with a queue;
generating a score associated with the queue using the attribute information; and
placing the score and QID in the score and QID fields, respectively, of an entry contained in the scorecard.

15. The method as defined in claim 9 further comprising:
determining the scorecard is full;
in response to the scorecard being full, determining if a generated score is greater than a score contained in the scorecard; and
if so, replacing a lowest score in the scorecard with the generated score.

16. The method as defined in claim 9 further comprising:
determining the scorecard is not full; and
in response to the scorecard being not full, adding a generated score to the scorecard.

17. An apparatus for improving utilization of a data link coupled to a network comprising:
a packet buffer containing one or more queues configured to hold data, the one or more queues associated with an excess rate component;
means for generating scores for the one or more of the queues, the scores to represent ratings of eligibility to transfer data in accordance with the excess rate component;
means for maintaining a scorecard of the generated scores;
means for determining that a data link is idle; and
means for dequeuing data from a queue associated with a highest score in the scorecard, and transferring the data onto the data link, in response to determining that the data link has become idle.

18. The apparatus as defined in claim 17 further comprising:
means for acquiring attribute information associated with the one or more queues; and
means for using the attribute information to generate the scores for the one or more queues.

19. The apparatus as defined in claim 18 wherein the attribute information includes the excess rate component.

20. The apparatus as defined in claim 17 further comprising:
means for determining if a generated score is greater than a score contained in the scorecard; and
means for replacing a lowest score in the scorecard with the generated score if the generated score is greater than a score contained in the scorecard.

* * * * *

UNITED STATES PATENT AND TRADEMARK OFFICE
CERTIFICATE OF CORRECTION

| | | |
|---|---|---|
| PATENT NO. | : 7,640,355 B1 | Page 1 of 1 |
| APPLICATION NO. | : 10/636099 | |
| DATED | : December 29, 2009 | |
| INVENTOR(S) | : John W. Marshall | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1907 days.

Col. 8, Line 40, should read:

Like[[-]]wise, a value of "2.3" in the hierarchy field 460 repre-

Col. 10, Line 10, should read:

the auxiliary queue logic 370 trans[[-]]fers the QID 420 of the

Col. 10, Line 57, should read:

trans[[-]]fer data in accordance with the excess rate compo-

Signed and Sealed this

Twenty-eighth Day of September, 2010

David J. Kappos
*Director of the United States Patent and Trademark Office*